C. BOUILLON.
MOLDING MACHINE.
APPLICATION FILED JAN. 14, 1913.
1,069,383.
Patented Aug. 5, 1913.
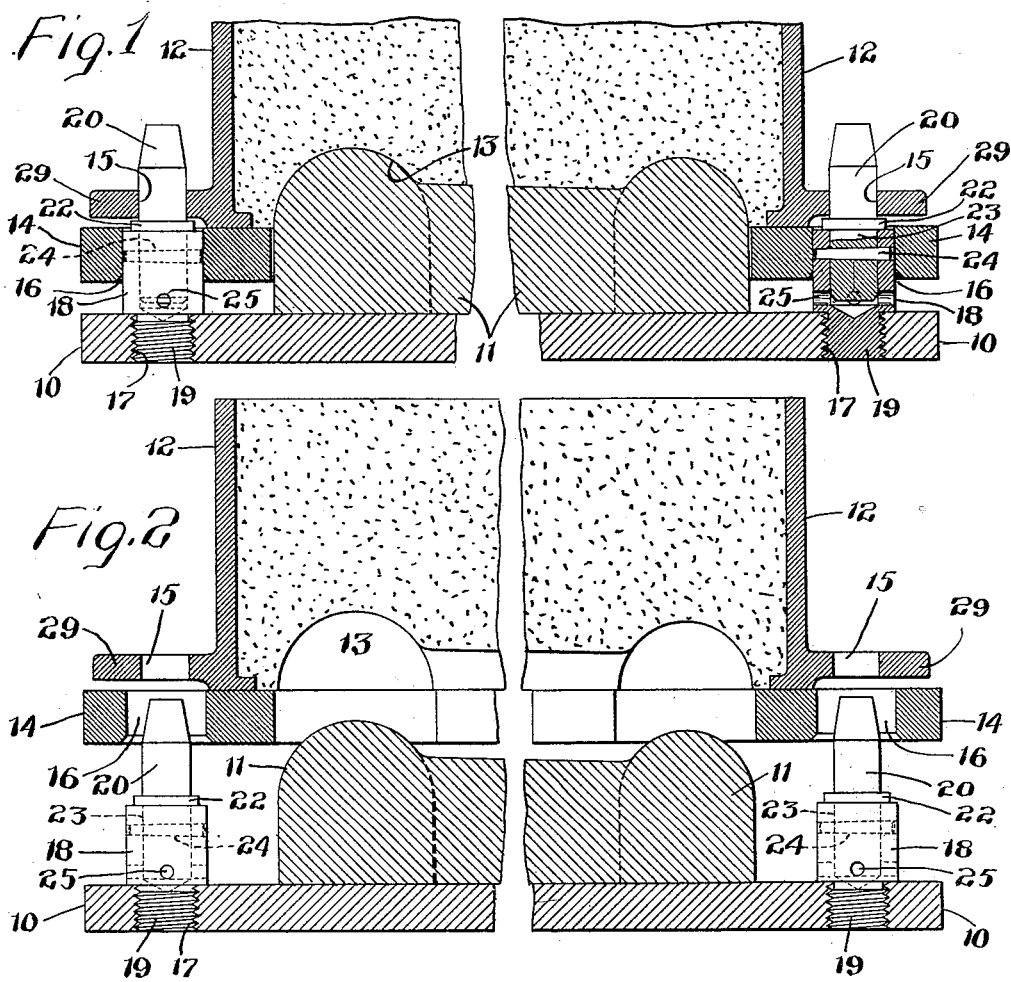
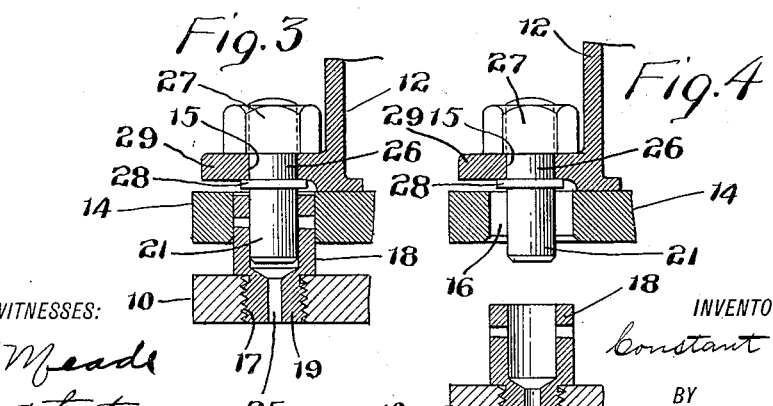
WITNESSES:
H. W. Meade
S. W. Atherton
INVENTOR
Constant Bouillon
BY
H. M. Wooster
ATTORNEY

UNITED STATES PATENT OFFICE.

CONSTANT BOUILLON, OF TORRINGTON, CONNECTICUT.

MOLDING-MACHINE.

1,069,383. Specification of Letters Patent. Patented Aug. 5, 1913.

Application filed January 14, 1913. Serial No. 741,960.

*To all whom it may concern:*

Be it known that I, CONSTANT BOUILLON, a citizen of the United States, residing at Torrington, county of Litchfield, State of Connecticut, have invented an Improvement in Molding-Machines, of which the following is a specification.

This invention relates to the class of molding machines in which the pattern is withdrawn from the mold by means of a reciprocating table or pattern plate by which the pattern is carried. It is of course well understood that in this type of machines one-half of each mold is formed in a flask and the other half of the mold is formed in another flask, one flask being provided with dowel pins and the other with holes to receive said pins, and furthermore, that the machines are ordinarily used in pairs, one machine making one-half of the molds, the other machine making the other half of the molds; the flasks used upon one machine being required to have dowel pins and the flasks used upon the other machine to have holes to receive said pins.

My present invention has for its object to provide means carried by the table or pattern plate, and adapted either to carry a dowel pin to engage a flask having a hole or to receive a dowel pin carried by a flask and which shall also, when the table or flask frame is raised to carry the pattern into the flask, engage the flask frame, a stripper plate or any fixed portion of the machine for the purpose of retaining the flask securely in position while the mold is being rammed.

With these and other objects in view I have devised the novel structure which I will now describe, referring to the accompanying drawing forming a part of this specification and using reference characters to indicate the several parts.

Figure 1 is a view partly in elevation and partly in section of so much of a molding machine as is necessary to illustrate the present invention, the parts being in position for ramming the mold; Fig. 2 a similar view showing the pattern plate or table moved downward, the pattern withdrawn from the mold and the dowel pins withdrawn from the flask so that the latter, with the mold, may be removed from the flask frame, stripper plate or whatever portion of the machine may be utilized to support the flask; Fig. 3 a detail view corresponding with Fig. 1 but showing the dowel pins carried by the flask instead of by the table or pattern plate, and Fig. 4 is a similar view, the position of the parts corresponding with Fig. 2.

10 denotes a vertically movable table or pattern plate, it being wholly immaterial so far as the present invention is concerned whether a pattern plate is used or the pattern is secured to the table, 11 the pattern, 12 the flask, 13 the mold and 14 a plate which is a fixed portion of the machine and may be an ordinary flask frame or a stripper plate. The flask is provided with lugs 29 having holes 15 which are adapted to receive the dowel pins when they are carried by the table, as in Figs. 1 and 2, or as a means of securing the dowel pins to the flask when the dowel pins are carried by the flask, as in Figs. 3 and 4. Plate 14 is provided with holes 16 of greater diameter than the holes in the flask and the table is provided with threaded holes 17.

18 denotes socket pieces which are provided with threaded shanks 19 to engage holes 17 in the table.

20 denotes dowel pins adapted to be carried by the table and 21 dowel pins adapted to be carried by the flask. Dowel pins 20 are provided with collars 22 which are adapted to rest upon the socket pieces and with shanks 23 which fit the socket pieces closely. Dowel pins 20 are retained in the socket pieces by means of set screws or pins 24 which pass through corresponding holes in the socket pieces and the shanks, as clearly shown in Fig. 1.

The socket pieces are preferably provided with holes 25, which may be lateral as in Figs. 1 and 2, or vertical as in Figs. 3 and 4, for the purpose of cleaning out sand, should it accumulate therein in the process of casting.

Holes 16 in the fixed plate are of just sufficient diameter to receive the socket pieces when the table is moved upward, as in Fig. 1, from which the operation will be clearly understood. When the table is moved upward the pattern will pass into the flask, the dowel pins will engage holes 15 in the flask and the socket pieces will pass into holes 16 in the fixed plate. The parts are then ready for filling the flask with sand and ramming, the engagement of the dowel pins with the flask and the socket pieces and the engagement of the socket pieces with the fixed plate insuring perfect firmness and rigidity of the flask.

Dowel pins 21 are provided with shanks 26 which pass through the holes 15 in the flask. The outer ends of these shanks are threaded for engagement by nuts 27 which draw the collars 28 on said dowel pins tightly against the underside of the lug or flange on the flask, as clearly shown in Figs. 3 and 4. In this form, the socket pieces engage the fixed plates when the table rises and the dowel pins pass into the socket pieces, the engagement of the socket pieces with the holes in the fixed plates and the engagement of the dowel pins with the socket pieces holding the flask securely as before. In either form, when the table and pattern are lowered the flask and mold may be readily removed from the fixed plate.

Having thus described my invention I claim:

The combination with a socket piece having a transverse hole, of a dowel pin having a shank engaging the socket piece, a collar adapted to rest on the socket piece and means for securing the dowel pin to the socket piece.

In testimony whereof I affix my signature in presence of two witnesses.

CONSTANT BOUILLON.

Witnesses:
L. BOGARDUS,
WILLIAM W. BIERCE.

---

Copies of this patent may be obtained for five cents each, by addressing the "Commissioner of Patents, Washington, D. C."